(12) United States Patent
Minaguchi et al.

(10) Patent No.: US 7,500,254 B2
(45) Date of Patent: Mar. 3, 2009

(54) ELECTRONIC APPARATUS COMPRISING RECEPTACLE FOR STORING DISK DRIVE

(75) Inventors: Hiroyuki Minaguchi, Higashimatsuyama (JP); Nobuyasu Tajima, Ome (JP); Masanori Sato, Ome (JP); Hidemi Itakura, Nishitama-gun (JP); Takayuki Arisaka, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 746 days.

(21) Appl. No.: 10/805,532

(22) Filed: Mar. 22, 2004

(65) Prior Publication Data
US 2004/0240172 A1    Dec. 2, 2004

(30) Foreign Application Priority Data
Mar. 26, 2003 (JP) .............................. 2003-084236

(51) Int. Cl.
*G11B 33/02* (2006.01)
(52) U.S. Cl. ....................................... 720/650; 361/685
(58) Field of Classification Search ................. 361/685, 361/684, 683, 799; 720/650
See application file for complete search history.

(56) References Cited

U.S. PATENT DOCUMENTS

| 5,262,923 | A | * | 11/1993 | Batta et al. .................. 361/685 |
| 5,587,854 | A | * | 12/1996 | Sato et al. ................. 360/97.01 |
| 5,917,435 | A | * | 6/1999 | Kamiya et al. ......... 340/995.26 |
| 6,025,987 | A | | 2/2000 | Allirot et al. |
| 6,141,222 | A | * | 10/2000 | Toor et al. .................... 361/726 |
| 6,166,900 | A | * | 12/2000 | Flynn et al. ................. 361/685 |
| 6,219,323 | B1 | * | 4/2001 | Fukatsu et al. .............. 720/650 |
| 6,285,545 | B1 | * | 9/2001 | Lopez ......................... 361/683 |
| 6,299,266 | B1 | * | 10/2001 | Justice et al. ............ 312/223.2 |
| 6,385,040 | B2 | * | 5/2002 | Nabetani et al. ............. 361/684 |
| 6,456,501 | B1 | * | 9/2002 | Rubenstein et al. ......... 361/759 |
| 6,606,254 | B2 | * | 8/2003 | Yoneda ........................ 361/799 |
| 6,791,828 | B2 | * | 9/2004 | Gough et al. ................ 361/685 |
| 6,947,355 | B2 | * | 9/2005 | Hong et al. ............... 369/30.27 |
| 7,185,346 | B2 | * | 2/2007 | Watanabe et al. ........... 720/613 |

FOREIGN PATENT DOCUMENTS

| JP | 06302080 | * | 10/1994 |
| JP | 10-133776 | | 5/1998 |
| JP | 2001-134344 | | 5/2001 |

* cited by examiner

*Primary Examiner*—Angel A. Castro
(74) *Attorney, Agent, or Firm*—Pillsbury Winthrop Shaw Pittman, LLP

(57) ABSTRACT

An electronic apparatus is provided with a housing having a receptacle, a disk drive removably stored in the receptacle, and a grounding metal member attached to the disk drive. The disk drive has a depressed section, and this depressed section is exposed to the receptacle when the disk drive is stored in the receptacle. The grounding metal member is located in the depressed section and includes a first conduction portion. The receptacle of the housing has a second conduction portion. When the disk drive is stored in the receptacle, the second conduction portion comes into contact with the first conduction portion of the grounding metal member, thereby providing ground-connection between the disk drive and the housing.

5 Claims, 13 Drawing Sheets

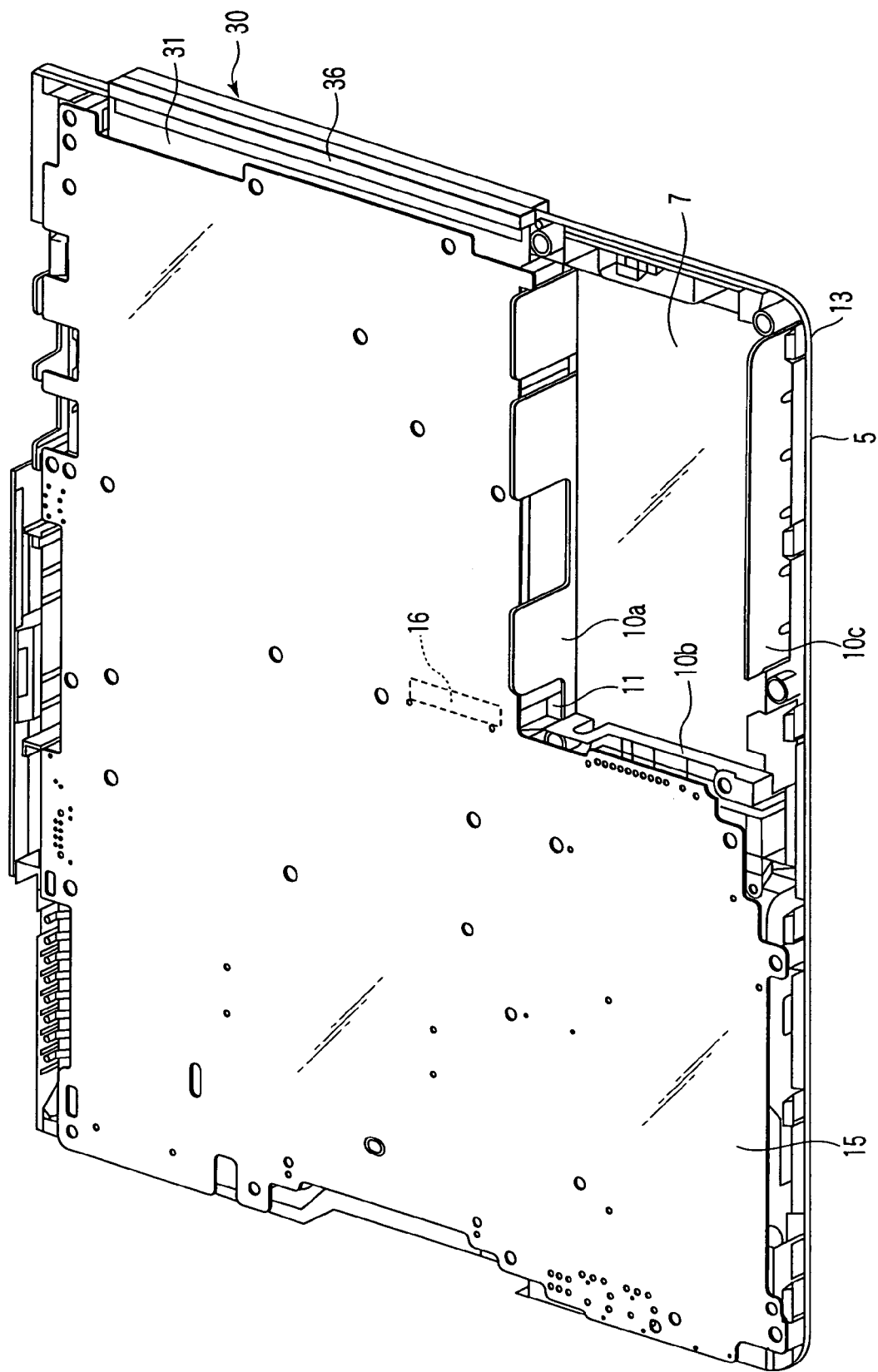
F I G. 4

ELECTRONIC APPARATUS COMPRISING RECEPTACLE FOR STORING DISK DRIVE

CROSS-REFERENCE TO RELATED APPLICATIONS

This application is based upon and claims the benefit of priority from prior Japanese Patent Application No. 2003-084236, filed Mar. 26, 2003, the entire contents of which are incorporated herein by reference.

BACKGROUND OF THE INVENTION

1. Field of the Invention

The present invention relates to an electronic apparatus such as a portable computer comprising an optical disk drive, more particularly to a structure for ground-connecting the optical disk drive to the housing of the portable computer.

2. Description of the Related Art

A recent portable computer comprises an optical disk drive, such as a CD-ROM drive, a DVD drive and a CD-R drive. By inserting an optical disk into the optical disk drive, video data and music data of high capacity are reproduced. The optical disk drive is removable from the housing of the portable computer, so that an appropriate drive can be selected in accordance with how the portable computer is used or how the user's request is.

Jpn. Pat. Appln. KOKAI Publication No. 10-133776 discloses a portable computer comprising an optical disk drive. The portable computer includes a main unit and a display unit supported by the main unit. The main unit has a receptacle in which the optical disk drive can be stored. The receptacle is a depression which is open in both the bottom wall and the side wall of the main unit, and the size of the receptacle is such that the optical disk drive can be fitted in the receptacle. The optical disk drive includes a storage section in which an optical disk can be stored or held, and a driving section for rotating the optical disk. The storage section and the driving section are covered with a metallic case.

Where the optical disk drive is detachable from the main unit, it is electrically connected to the ground of the main unit. With this structure, the radiation of the electromagnetic noise is suppressed, and the noise is prevented from entering the main unit. The portable computer shown in the publication comprises a metallic conduction member on the inner surface of the receptacle. The conduction member is electrically connected to the ground of the printed circuit board stored in the main unit, and is projected toward the receptacle. When the optical disk drive is fitted in the receptacle, the conduction member comes into contact with the metallic case of the optical disk drive. As a result, the optical disk drive is ground-connected to the main unit.

With the above structure, when the optical disk drive is fitted in the receptacle, the optical disk drive deforms the conduction member and pushes it into the main unit. The main unit therefore requires a gap in which to receive the conduction member. The need to provide such a gap results in a dead space inside the main unit. As a result, a plurality of components cannot be arranged in order inside the main unit, and the main unit cannot be easily designed to be compact.

U.S. Pat. No. 6,025,987 discloses an electronic apparatus comprising a disk drive. A pair of support members are attached to the disk drive. The support members permit the disk drive to be supported on the electronic apparatus, and are located on the opposing sides of the disk drive. In the state where the disk drive is attached to the electronic apparatus, the support members are located between the disk device and the electronic apparatus. As can be seen from this, the disk drive is ground-connected to the electronic apparatus.

This structure has problems in that a space in which to receive the support members must be provided between the disk drive and the electronic apparatus. The electronic apparatus therefore has an increased width and cannot be designed to be compact. In addition, the support member becomes an obstacle when components are arranged inside the electronic apparatus with efficiency.

Jpn. Pat. Appln. KOKAI Publication No. 2001-134344 discloses an optical disk drive for use in a notebook type portable computer. The optical disk drive comprises a storage section which stores an optical disk, and a driving section which rotates the optical disk. The storage section and the driving section overlap each other. The storage section is wider than the driving section and has its one end projected horizontally from the driving section. In other words, the optical disk drive has a depression defined by one end of the storage section and the driving section. When the optical disk drive is housed in the main unit of the portable computer, the depression is exposed inside the main unit.

The main unit houses a plurality of components such as a printed circuit board, a connector, a battery, etc. Some of these components are arranged in the depression of the optical disk drive. In this manner, the depression is used as a space in which to store the components.

However, this document does not disclose anything regarding ground-connection between the optical disk drive and the main unit.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 is a perspective view showing how a printed circuit board and the optical disk drive are mounted on the lower case in the embodiment of the present invention.

DETAILED DESCRIPTION OF THE INVENTION

An embodiment of the present invention will now be described, referring to the accompanying drawings.

Figure 1:
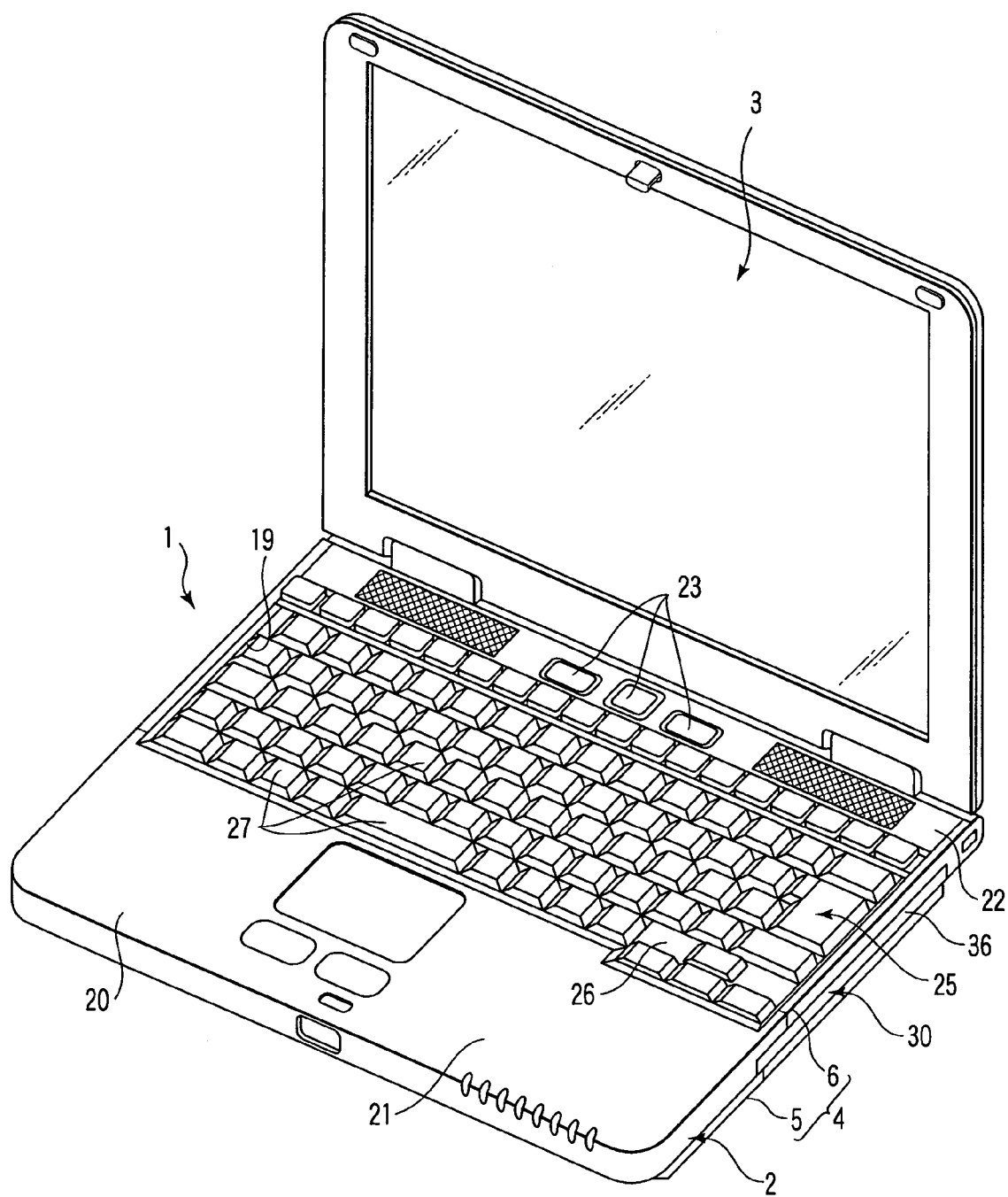
FIG. 1 is a perspective view of a portable computer according to one embodiment of the present invention.

FIG. 1 shows a portable computer 1, which is an example of an electronic apparatus. The electronic apparatus comprises a main unit 2 and a display unit 3. The display unit 3 is rotatably supported by the rear end of the main unit 2.

Figure 2:
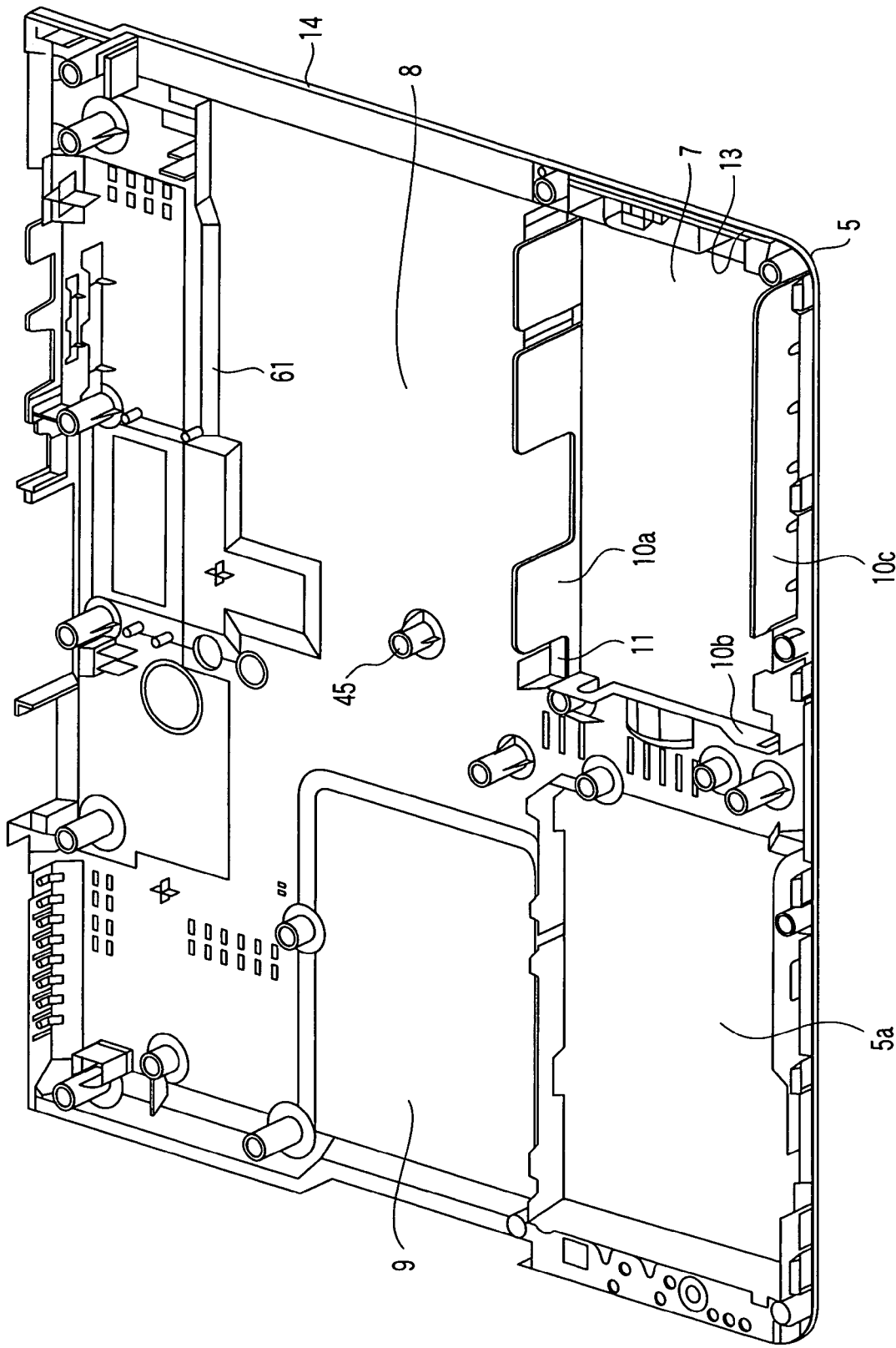
FIG. 2 is a perspective view of a lower case used in the embodiment of the present invention.
Figure 3:
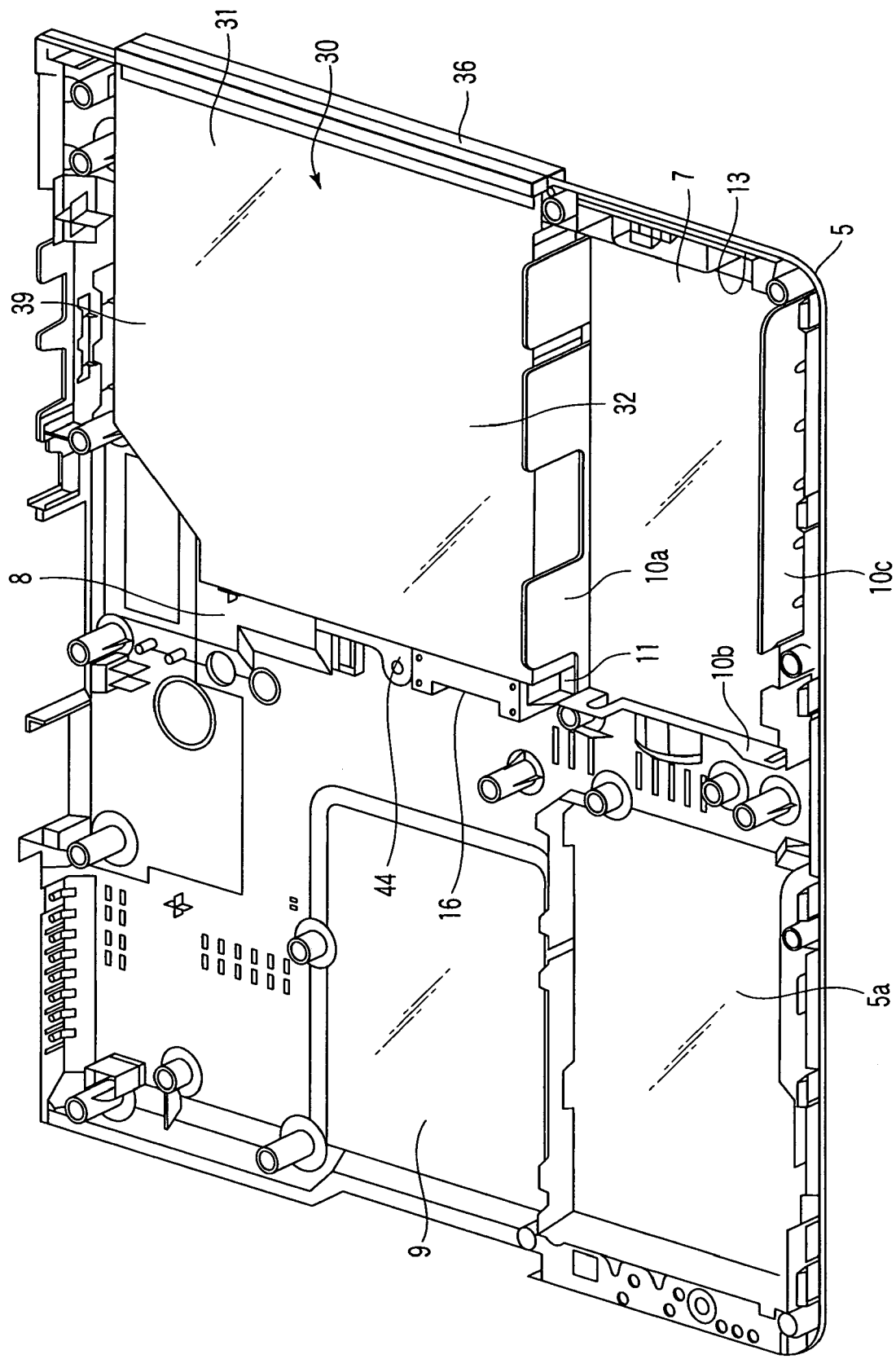
FIG. 3 is a perspective view showing how an optical disk drive is mounted on the lower case in the embodiment of the present invention.

The main unit 2 includes a housing 4 formed of synthetic resin. The housing 4 is made up of a lower case 5 and an upper case 6. As shown in FIGS. 2 and 3, the lower case 5 has a bottom 5a, and a first receptacle 7, a second receptacle 8 and a third receptacle 9 are formed on the bottom 5a. The first receptacle 7 is designed to hold a battery pack (not shown) and is located in the front portion of the lower case 5. The first receptacle 7 is a region defined by first to third partitioning walls 10a-10c. The first to third partitioning walls 10a-10c rise from the bottom 5a.

The second receptacle 8 is located behind the first receptacle 7. The first receptacle 7 and the second receptacle 8 are arranged in the depth direction of the lower case 5 and are partitioned by the first partitioning wall 10a. The first portioning wall 10a has a cutout section 11. The cutout section 11 is open in both the first and second receptacles 7 and 8. In other words, the first receptacle 7 and the second receptacle 8 communicate with each other through the cutout section 11.

The third receptacle 9 is designed to hold a computer module (not shown) such as a hard disk drive or a modem. The third receptacle 9 is on the left side of the second receptacle 8. The second receptacle 8 and the third receptacle 9 are arranged side by side in the widthwise direction of the lower case 5.

The lower case 5 has a first opening 13 and a second opening 14. The first and second openings 13 and 14 are located on the right side of the lower case 5 and are arranged in the depth direction of the lower case 5. The first opening 13 is open in the first receptacle 7, and the second opening 14 is open in the second receptacle 8.

As shown in FIG. 4, the lower case 5 supports a printed circuit board 15. The printed circuit board 15 faces the bottom 5a of the lower case 5 and covers the second and third receptacles 8 and 9 from above. The printed circuit board 15 is fixed to the lower case 5 by means of screws. The printed circuit board 15 has a connector receptacle 16. The connector receptacle 16 is located at the terminating end of the second receptacle 8 and is opposed to the second opening 14.

Figure 5:
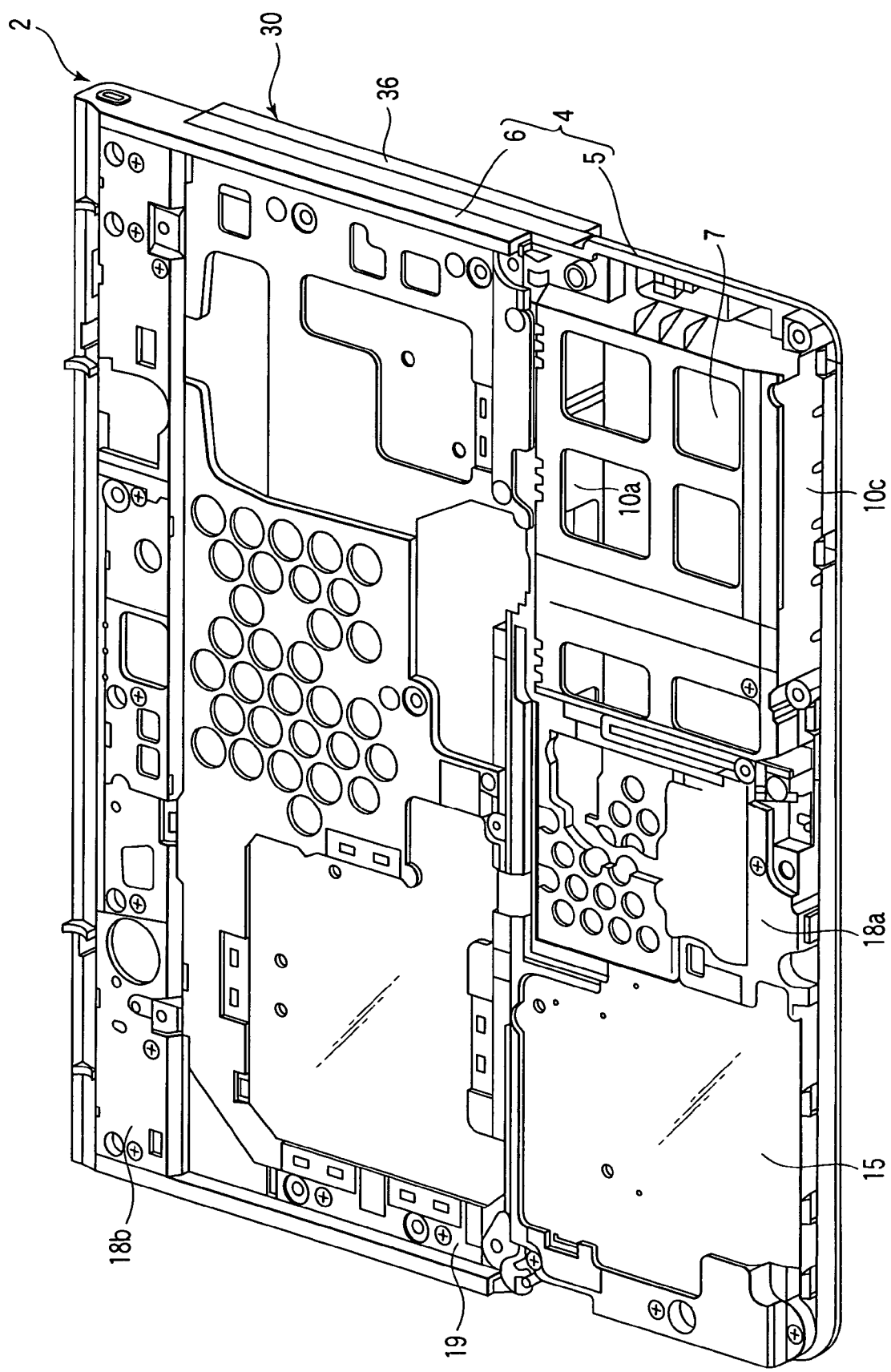
FIG. 5 is a perspective view showing how an upper case is attached to the lower case in the embodiment of the present invention.

FIG. 5 shows how the upper case 6 is attached to the lower case 5. After the printed circuit board 15 is fixed to the lower case 5, the upper case 6 is coupled to the lower case 5 by means of screws. The tip ends of the screws penetrate the printed circuit board 15 and screwed into the lower case 5.

Therefore, the printed circuit board 15 is interposed between the lower case 5 and the upper case 6.

Figure 6:
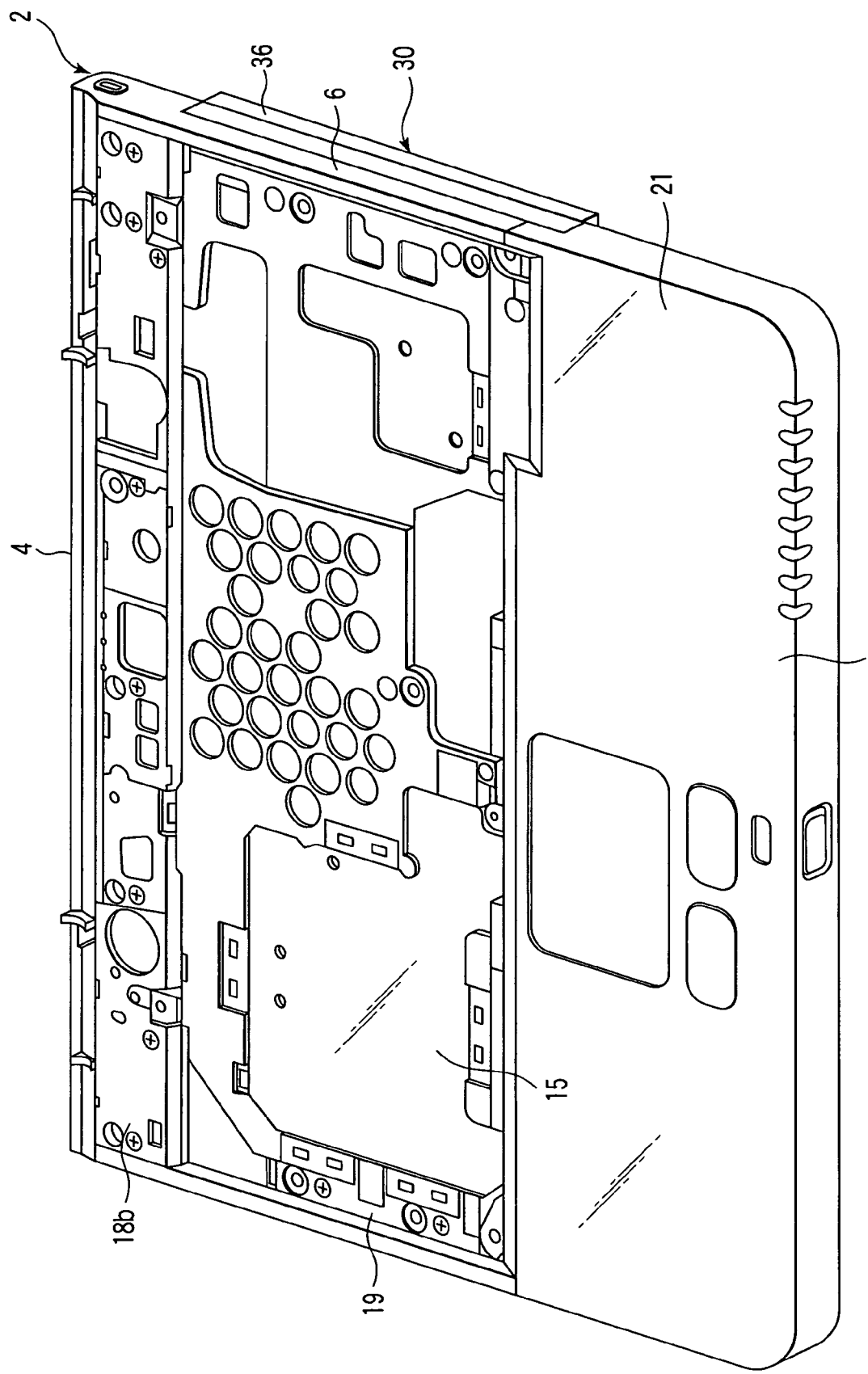
FIG. 6 is a perspective view showing how a first cover is attached to the front portion of the upper case in the embodiment of the present invention.
Figure 7:
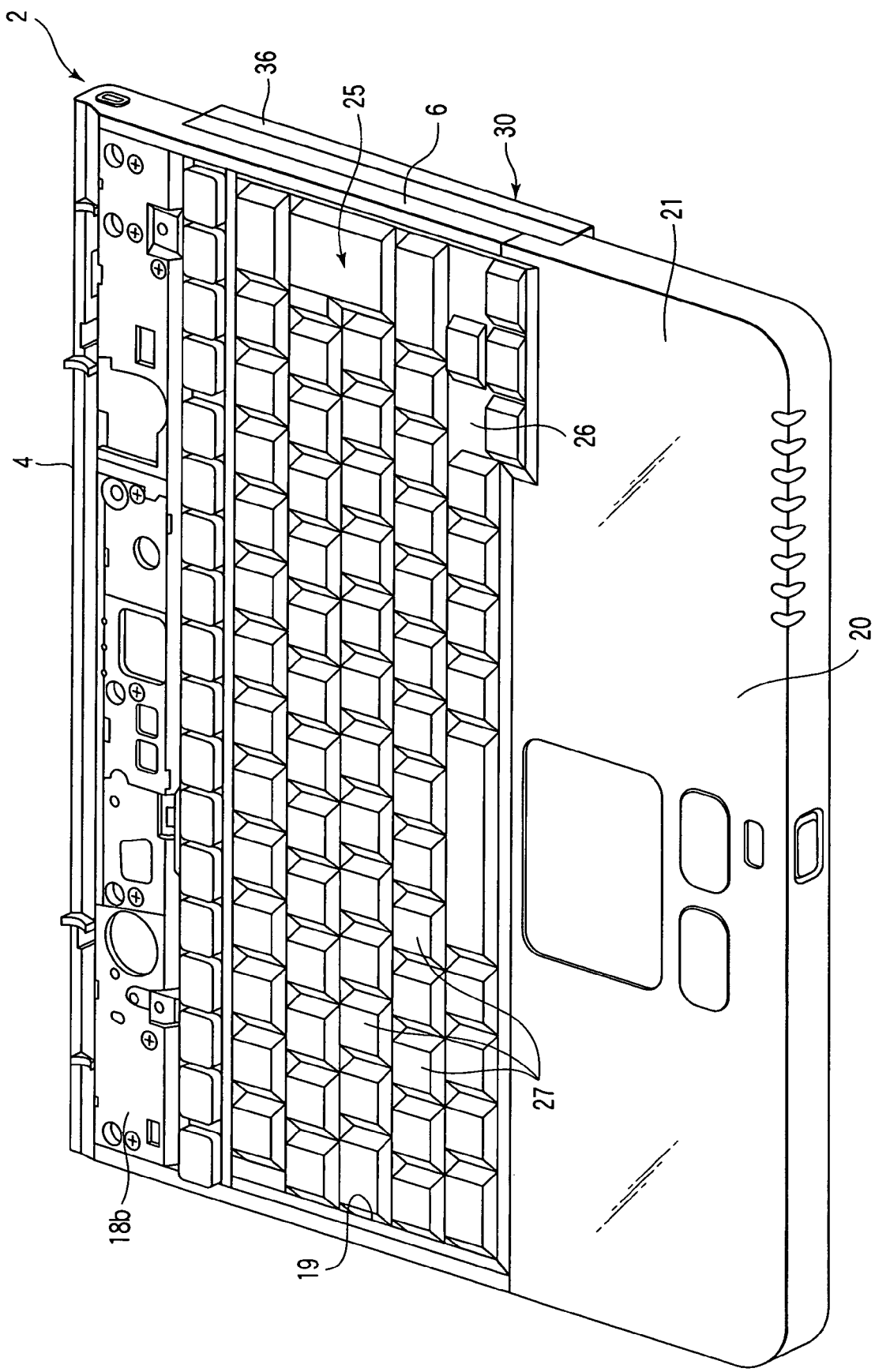
FIG. 7 is a perspective view showing how the first cover and a keyboard are attached to the upper case.

The upper case 6 includes a front section 18a, a rear section 18b and a keyboard attachment section 19. The front section 18a is located above the first receptacle 7. The front section 18a and the front end portion of the lower case 5 are covered with a first cover 20, which is shown in FIG. 6. The first cover 20 serves as a palm rest 21 as well. The first cover 20 has a plurality of latches. These latches can be brought into detachable engagement with the front portion 18a of the upper case 6 and thus enable the first cover 20 to be held on the front section 18a. In this manner, the first cover 20 can coupled to the front section 18a without using screws, and can be easily detached, if necessary.

The rear section 18b of the upper case 6 is located above the rear end of the lower case 5. The rear section 18b supports a pair of loudspeakers and a switch board. The rear section 18b is covered with a second cover 22, which is shown in FIG. 1. The second cover 22 supports a plurality of operation buttons 23. The operation buttons 23 are arranged in a line in the widthwise direction of the housing 4. The second cover 22 has a plurality of latches. These latches come into detachable engagement with the rear section 18b of the upper case 6 and permit the second cover 22 to be held on the rear section 18b. In this manner, the second cover 22 can be connected to the rear section 18b without using screws, and is easily detachable from the rear section 18b.

As shown in FIGS. 5 and 6, the keyboard attachment section 19 is located between the front section 18a and the rear section 18b. The first cover 20, with which the front section 18a is covered, defines a front edge of the keyboard attachment section 19. The second cover 22, with which the rear section 18a is covered, defines a rear edge of the keyboard attachment section 19.

The keyboard attachment section 19 supports a keyboard 25. The keyboard 25 includes a keyboard base 26 and a plurality of key tops 27. The keyboard 25 is held on the keyboard attachment section 19 through the use of the first and second covers 20 and 22. The procedure for attaching the keyboard 25 to the keyboard attachment section 19 will be described.

First of all, the first cover 20 is attached to the front section 18a of the upper case 6. Then, the front edge portion of the keyboard base 26 is inserted into the keyboard attachment section 19 until it comes into engagement with the first cover 20. Subsequently, the keyboard base 26 is rotated downward, with the engagement portions between the front edge portion of the keyboard base 26 and the first cover 20 as a fulcrum, and the downward rotation of the keyboard 26 is continued until the keyboard base 26 drops onto the keyboard attachment section 19. As a result, the keyboard base 26 is stacked on the keyboard attachment section 19.

Thereafter, the second cover 22 is attached to the rear section 18b of the upper case 6. The rear edge portion of the keyboard base 26 is sandwiched between the second cover 22 and the keyboard attachment section 19. As a result, the keyboard 25 is fixed to the keyboard attachment section 19.

To detach the keyboard 25 from the keyboard attachment section 19, the second cover 22 is separated from the rear section 18b of the upper case 6. By so doing, the rear edge portion of the keyboard base 26 is released from the sandwiched state. Subsequently, the keyboard base 26 is pulled in the direction away from the first cover 20. As a result, the keyboard 25 is detached from the keyboard attachment section 19.

Figure 8:
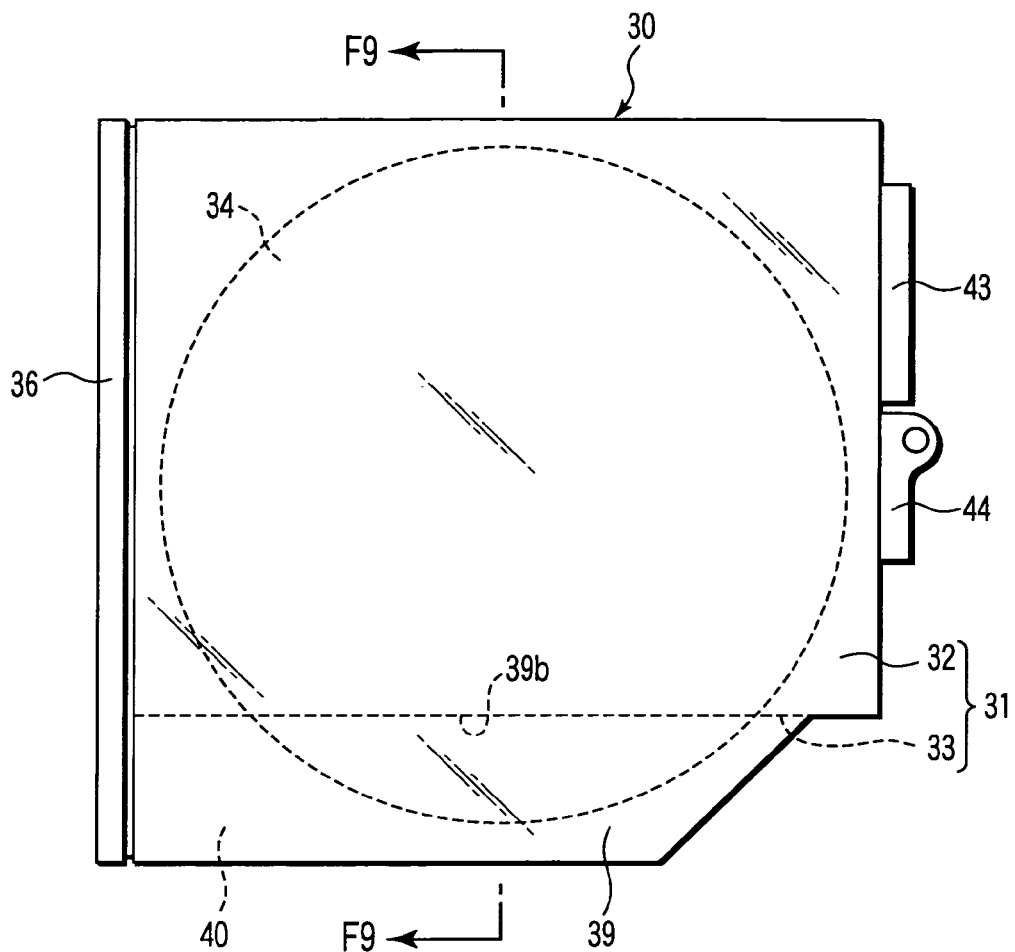
FIG. 8 is a plan view of the optical disk drive according to an embodiment of the present invention.
Figure 9:
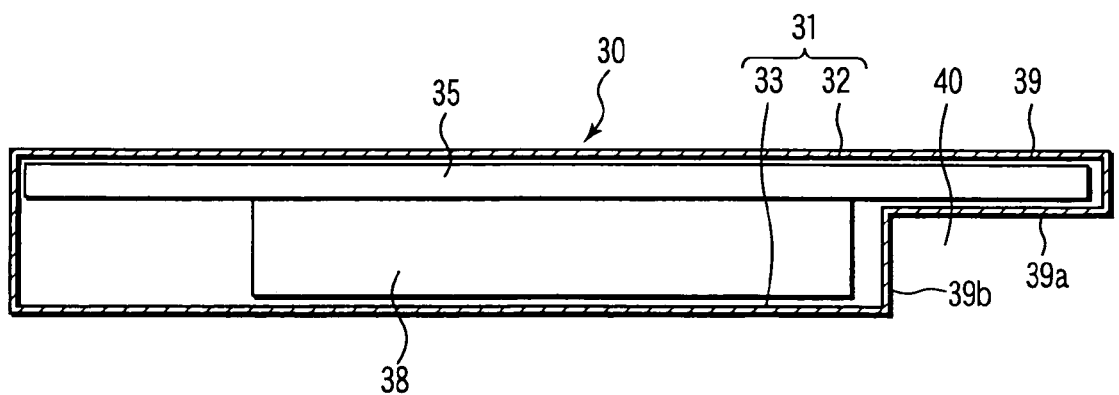
FIG. 9 is a sectional view taken along line F9-F9 of FIG. 8.
Figure 10:
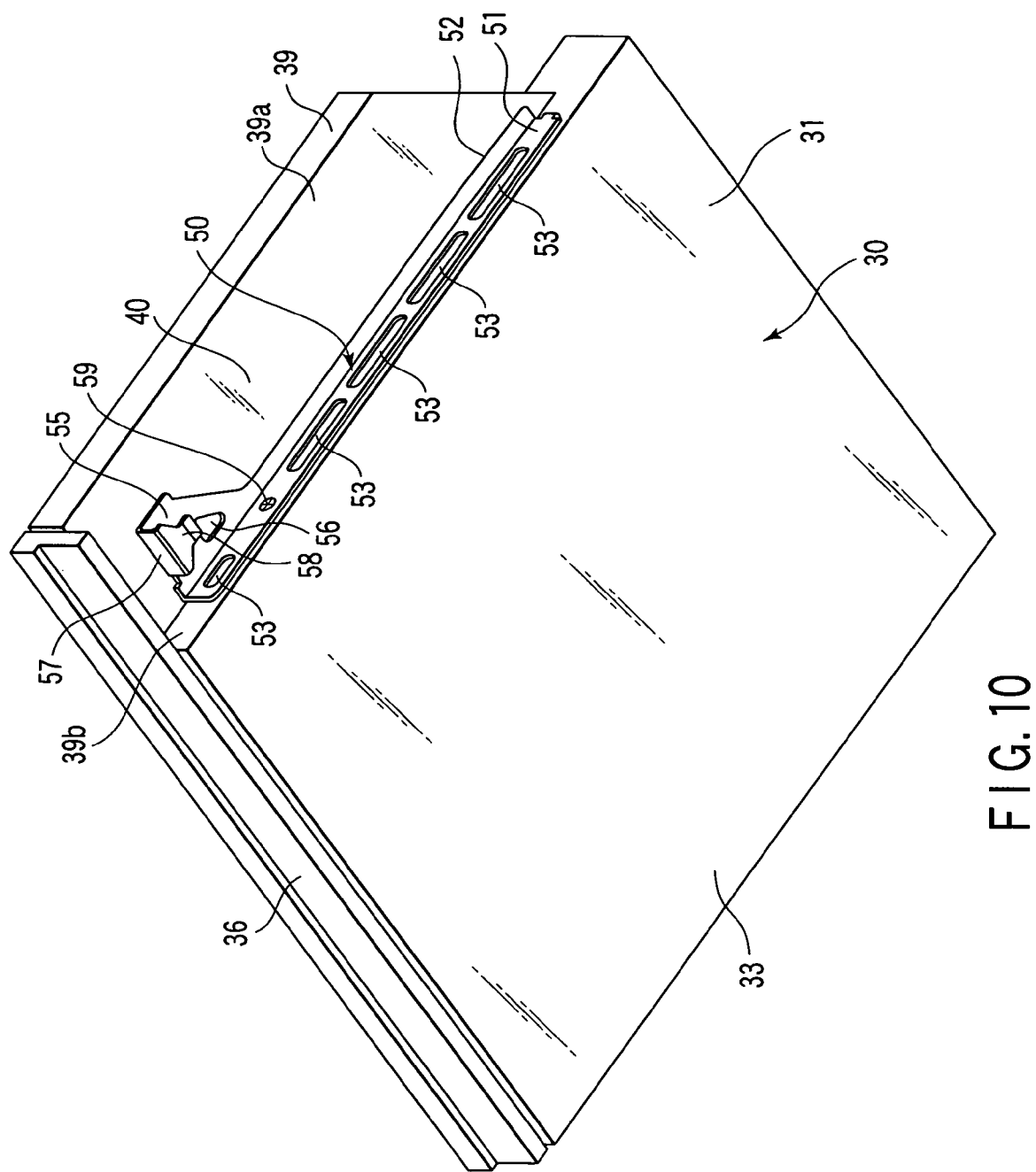
FIG. 10 is a perspective view showing how a grounding metal member is provided for the optical disk drive in the embodiment of the present invention.
Figure 11:
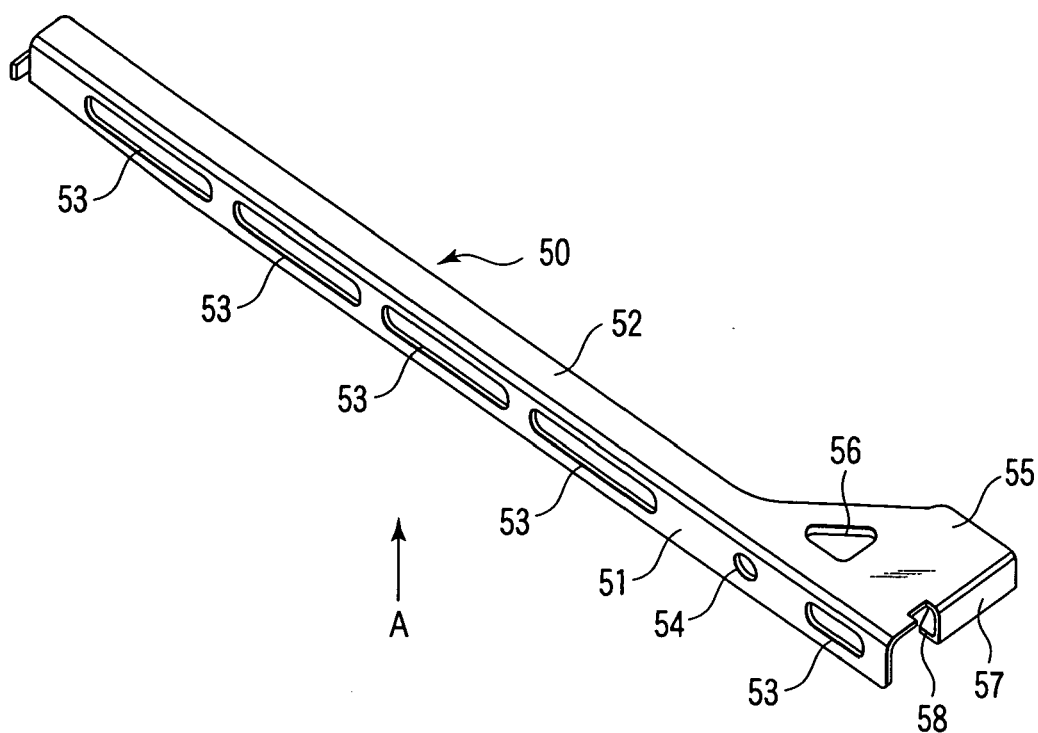
FIG. 11 is a perspective view showing the grounding metal member used in the embodiment of the present invention.

As shown in FIG. 3, the second receptacle 8 of the lower case 5 stores an optical disk drive 30 such as a CD-ROM drive or a DVD-ROM drive. The optical disk drive 30 is inserted through the second opening 14 into the second receptacle 8 and is removable therefrom. As shown in FIGS. 8 through 10, the optical disk drive 30 is provided with a metallic housing 31. The housing 31 is like a flat box and can be fitted in the second receptacle 8. The housing 31 includes a tray storage section 32 and a disk driving section 33.

The tray storage section 32 stores a tray 35 on which a disk medium 34 such as an optical disk is supported. The tray 35 can be pulled out from the tray storage section 32 and has a front panel 36 at the distal end thereof. The front panel 36 covers the second opening 14 of the lower case 5. The disk driving section 33 has a driving source 38 (e.g., a spindle motor) for rotating the medium 34. The disk driving section 33 and the tray storage section 32 overlap each other, and the disk driving section 33 is located lower than the tray storage section 32.

The tray storage section 32 is larger than the disk driving-section 33. In other words, the tray storage section 32 has a projection 39 projected from one end of the disk driving section 33. The projection 39 has a first surface 39a facing the bottom 5a of the lower case 5b. The disk driving section 33 has a second surface 39b at one end thereof. The second surface 39b is perpendicular to the first surface 39a. The second surface 39a is in the plane corresponding to the thickness direction of the housing 4.

The housing 31 has a depressed section 40. The depressed section 40 is defined by the projection 39 of the tray storage section 32 and the one-end portion of the disk driving section 33. The first surface 39a of the projection 39 and the second surface 39b of the disk driving section 33 are exposed to the depressed section 40. The depressed section 40 is exposed to the second receptacle 8 and defines a space 41 with reference to the bottom 5a of the lower case 5. The space 41 extends in the widthwise direction of the housing 4.

As shown in FIGS. 3 and 8, the optical disk drive 30 includes a connector 43 and a fixing member 44. The connector 43 and the fixing member 44 are located on the side opposite to the front panel 36. When the optical disk drive 30 is inserted into the second receptacle 8 through the second opening 14, the connector 43 is fitted in the connector receptacle 16 of the printed-circuit board 15. As a result, the optical disk drive 30 is electrically connected to the printed circuit board 15. The fixing member 44 is located on a boss 45 (FIG. 2), which is protruded from the bottom 5a of the lower case S. One of the screws used for fixing the upper case 6 to the lower case 5 penetrates the fixing member 44 and is screwed into the boss 45. With this structure, the optical disk drive 30 is fixed to the second receptacle 8, thereby maintaining the connection between the connector 43 and the connector receptacle 16.

As shown in FIG. 10, a grounding metal member 50 (an electrical conduction member) is attached to the housing 31 of the optical disk drive 30. The grounding metal member 50 is formed of an aluminium alloy, for example. The grounding metal member 50 includes a first plate 51 and a second plate 52. The first plate 51 is an elongated plate extending along the second surface 39b of the disk driving section 33. The second plate 52 is an elongated plate extending along the first surface of the projection 39. In other words, the second plate 52 is in contact with the upper edge of the first plate 51 and forms 90° relative to the first plate 51. The first plate 51 and the second plate 52 are integrally formed as one piece.

Figure 12:
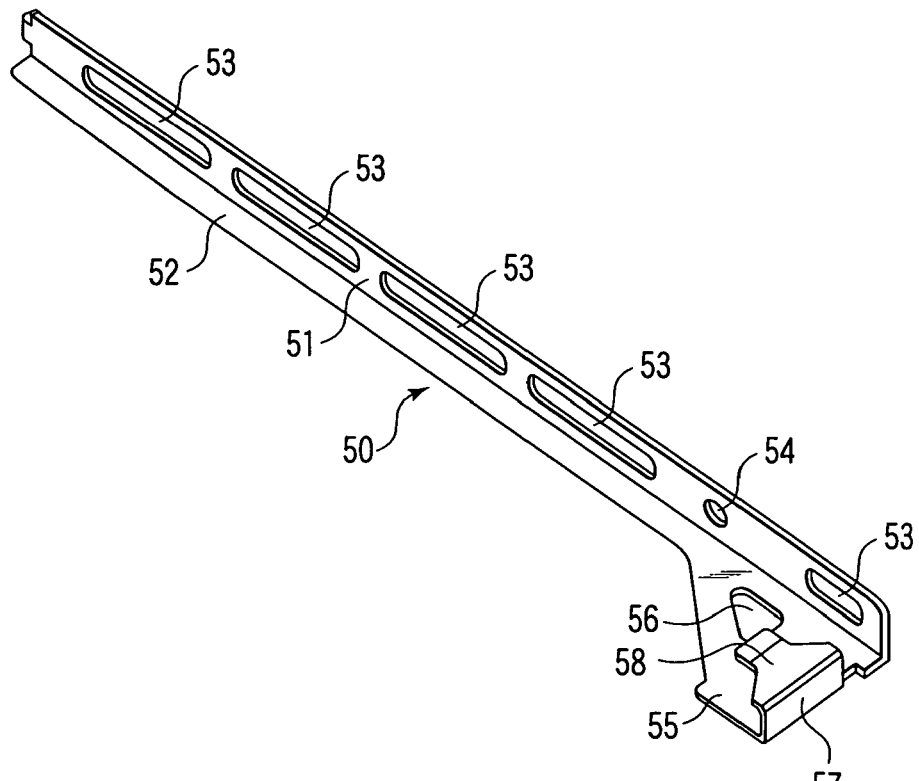
FIG. 12 is a perspective view showing how the grounding metal member looks like when viewed in the direction of Arrow A of FIG. 11.

As shown in FIGS. 10 and 12, the first plate 51 of the grounding metal member 50 has a number of through holes 53 and one-insertion hole 54. The through-holes 53 serve to reduce the weight of the grounding metal member 50. The through holes 53 are like slits and arranged at predetermined intervals in the longitudinal direction of the first plate 51. The insertion hole 54 is located at one longitudinal end of the first plate 51. The second plate 52 of the grounding metal member 50 has a wide portion 55 at one end. The wide portion 55 has one through hole 56 (which serves to reduce the weight of the wide portion 55) and a tongue piece 57. The tongue piece 57 is formed by bending the edge portion of the wide portion 55 by 90° so that the bent portion extends downward. The tongue piece 57 extends in the direction perpendicular to the first plate 51. The tongue piece 57 faces the front panel 36 of the tray 35. A conduction piece 58 (a first conduction section) is provided at the lower end of the tongue piece 57. The conduction piece 58 is formed by bending the lower end of the tongue piece 57 substantially by 90° and faces the wide portion 55 of the second plate 52. The conduction piece 58 is elastically deformable so that it can be moved closer to the second plate 52 or away therefrom.

The first plate 51 of the grounding metal member 50 is fixed to the second surface 39b of the disk driving section 33 by means of a screw 59. The screw 59 extends through the insertion hole 54 of the first-plate 51 and screwed into the second surface 39b. With this structure, the first plate 51 is in contact with the second surface 39b, and the second plate 52 is in contact with the first surface 39a. In this manner, the grounding metal member 50 is ground-connected to the optical disk drive 30.

In the state where the grounding metal member 50 is fixed to the second surface 39b of the disk driving section 33, the grounding metal member 50 is located in the depressed section 40 of the optical disk drive 30. In addition, when the optical disk drive 30 is received in the second receptacle 8, the grounding metal member 50 is set in the exposed state in the space 41 defined by the bottom 5a of the lower case 5 and the depressed section 40.

Figure 13:
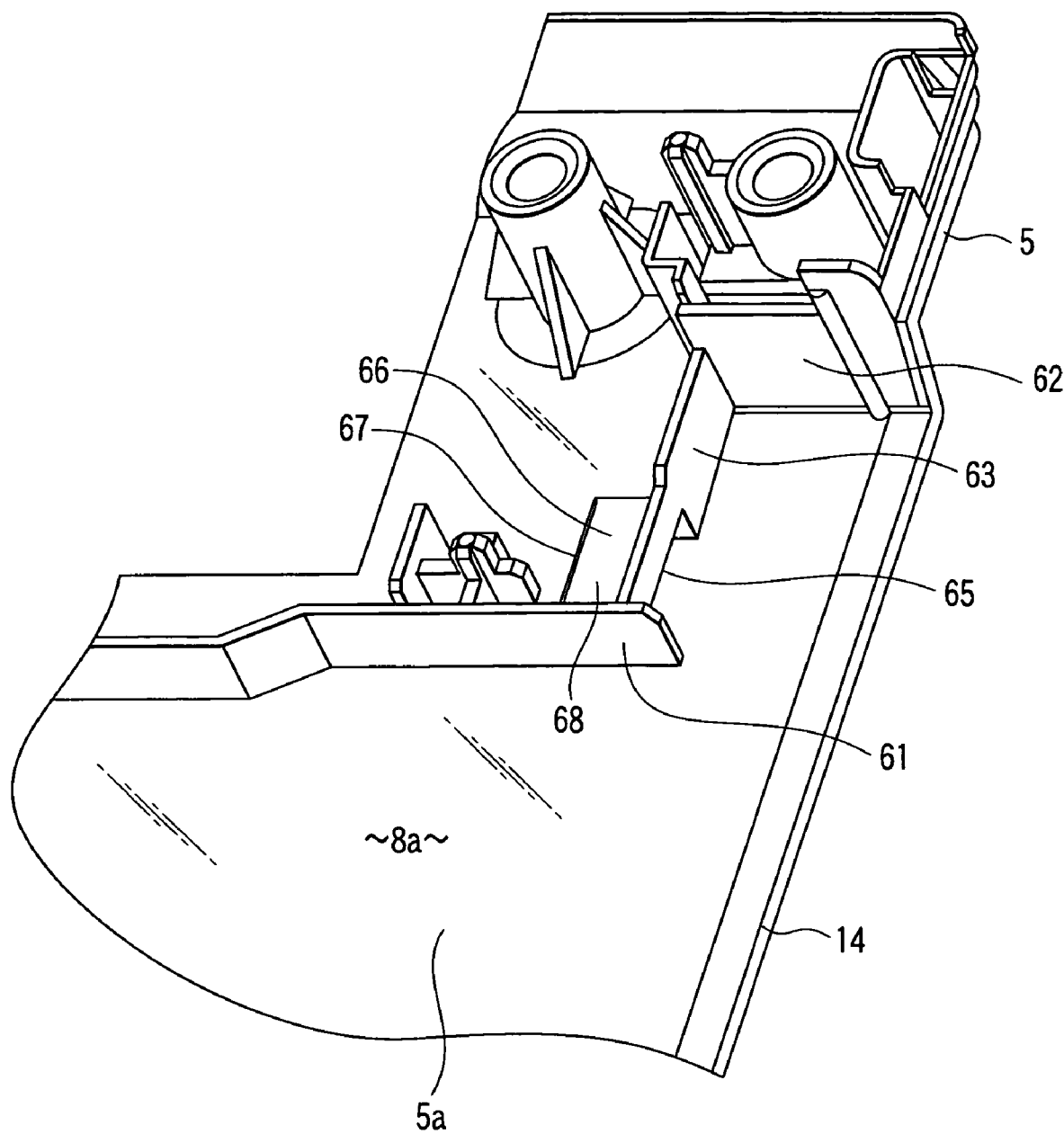
FIG. 13 is a perspective view showing the receptacle the embodiment of the present invention uses for storing the optical disk drive.
Figure 14:
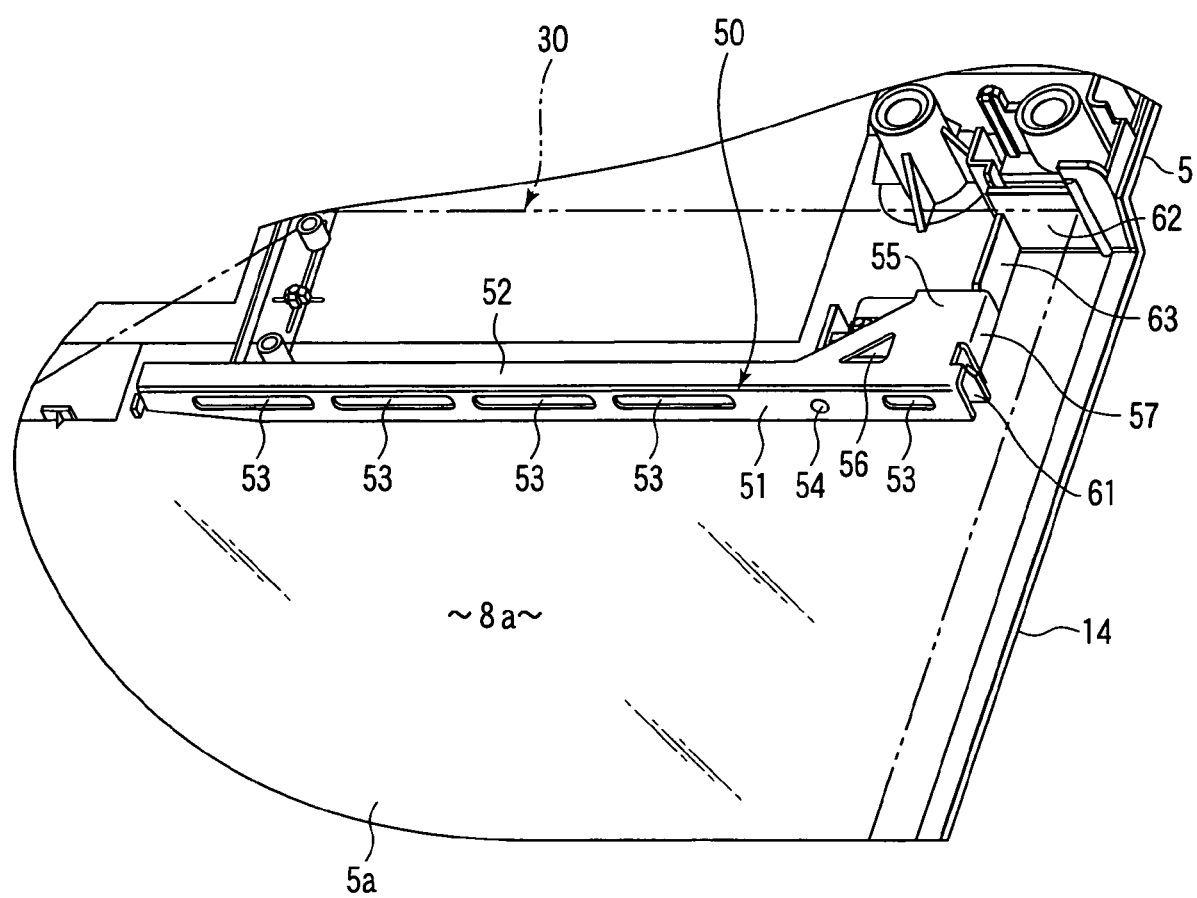
FIG. 14 is a perspective view showing how the positional relationships between the grounding metal member and the receptacle of the housing are in the embodiment of the present invention.

As shown in FIGS. 13 and 14, the second receptacle 8 of the lower case 5 has a guide wall 61 for guiding the insertion direction of the optical disk drive 30. The guide wall 61 rises from the bottom 5a of the lower case 5 and extends from the second opening 14 of the lower case 5 in the widthwise direction of the lower case 5. When the optical disk drive 30 is received in the second receptacle 8, the guide wall 61 is located in the space 41 defined by the bottom 5a of the lower case 5 and the depressed section 40. The guide wall 61 is in slidable contact with the first plate 51 of the grounding metal member 50.

Figure 15:
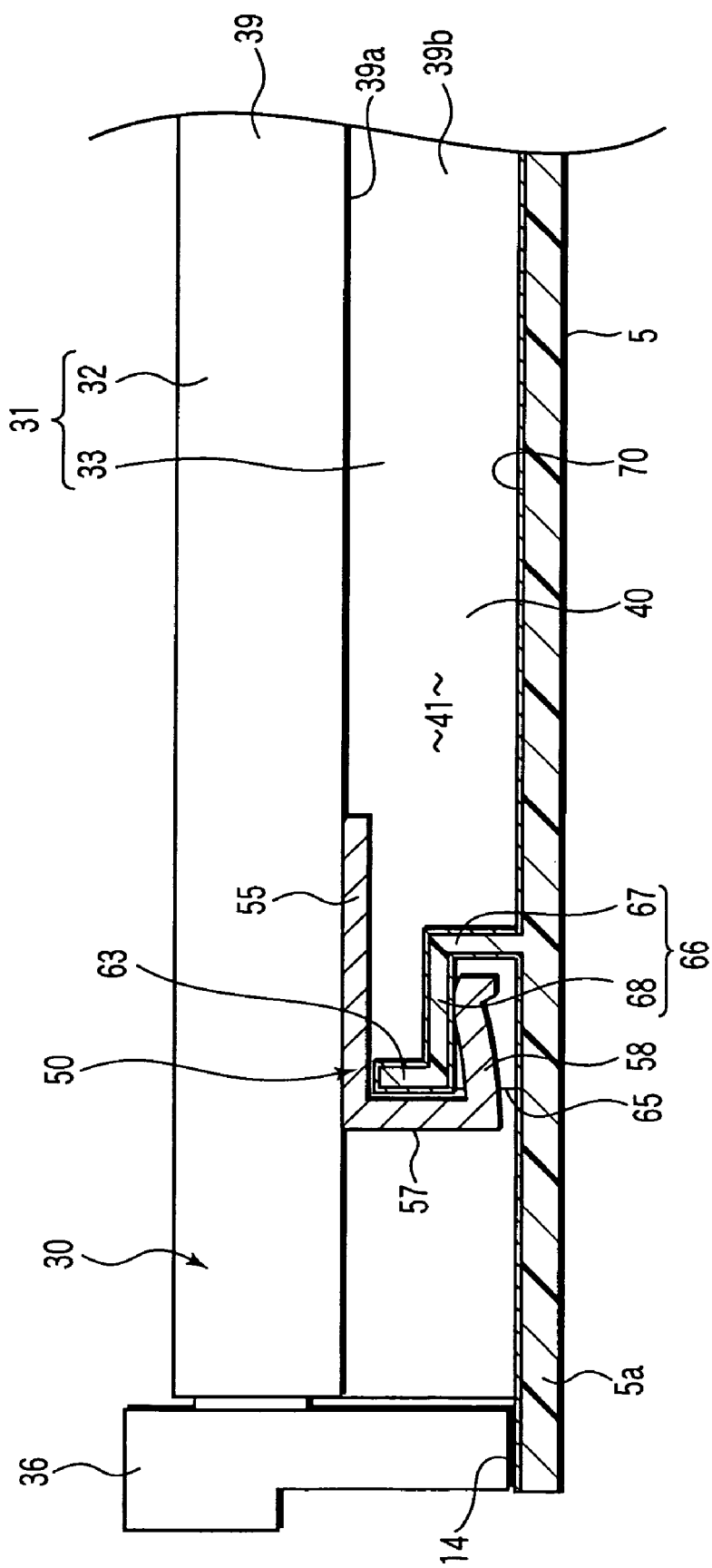
FIG. 15 is a sectional view showing how the positional relationships between the conduction member of the grounding metal member and the conduction wall of the housing are in the embodiment of the present invention.

The bottom 5a of the lower case 5 has a side wall 62 and a connecting wall 63. The side wall 62 rises from the bottom 5a and defines one end of the second opening 14. The connecting wall 63 also rises from the bottom 5a and extends in such a manner as to bridge the side wall 62 and the guide wall 61. Just in front of the second opening 14, the connecting wall 63 includes a portion perpendicular to the guide wall 61. As shown in FIGS. 14 and 15, the connecting wall 63 is located in the depressed section 40 of the optical disk drive 30 received in the second receptacle 8, and is opposed to the tongue piece 57 of the grounding metal member 50. The connecting wall 63 has a rectangular insertion hole 65 formed in the lower portion thereof, and the conduction piece 58 of the grounding metal member 50 is inserted through the rectangular insertion hole 65.

The bottom 5a of the lower case 5 has a conduction wall 66 projected toward the depressed section 40 of the optical disk drive 30. The conduction wall 66 includes a rising portion 67 rising from the bottom 5a, and a connecting portion 68 connecting the upper edge of the rising portion 67 and the connecting wall 63. The connecting portion 68 is continuous to the upper edge of the insertion hole 65 and faces the bottom 5a. The conduction piece 58 of the grounding metal member 50 is located between the connecting portion 68 of the conduction wall 66 and the bottom 5a.

As shown in FIG. 15, the bottom 5a of the lower case 5 has its inner surface coated with a plating layer 70, for electromagnetic shielding. The plating layer 70 is electrically connected to the ground of the printed circuit board 15 and thus maintains the same potential as the ground. The plating layer 70 covers both the conduction wall 66 and the connecting wall 63 continuously. In the present embodiment, therefore, the conduction wall 66 and the plating layer 70 define a second conduction portion.

The optical disk drive 30 provided with the grounding metal member 50 is inserted through the second opening 14 into the second receptacle 8 of the housing 4. At the time of insertion, the first plate 51 of the grounding metal member 50 moves along the guide wall 61. In this manner, the optical disk drive 30 is guided when it is inserted. When the optical disk drive 30 is completely inserted into the second receptacle 8, the connector 43 is fitted in the connector receptacle 16, and the optical disk drive 30 is electrically connected to the printed circuit board 15. Simultaneous with this, the conduction piece 58 of the grounding metal member 50 passes through the insertion hole 65 and moves into the region below the connecting portion 68 of the conduction wall 66. Then, the conduction piece 58 comes into elastic contact with the plating layer 70 covering the connecting portion 68. As a result of this contact, the optical disk drive 30 is ground-connected to the lower case 5 and the printed circuit board 15. Thus, the static electricity the optical disk drive 30 may have flows to the ground, and the electromagnetic noise inside the housing 4 is shielded.

As described above, the grounding metal member 50 and the conduction wall 66 of the housing 4 are located at positions corresponding to the depressed section 40 of the optical disk drive 30. When the optical disk drive 30 is received in the second receptacle 8, the space 41 between the depressed section 40 and the bottom 5a can be used as an installation space of both the grounding metal member 50 and the conduction wall 66. In other words, the housing 4 does not have to provide a space exclusively used for arranging the grounding metal member 50 and the conduction wall 66. Hence, the housing 4 can be compact, and yet the optical disk drive 30 can be ground-connected to the printed circuit board 15 and the housing 4.

Additional advantages and modifications will readily occur to those skilled in the art. Therefore, the invention in its broader aspects is not limited to the specific details and representative embodiments shown and described herein. Accordingly, various modifications-may be made without departing from the spirit or scope of the general inventive concept as defined by the appended claims and their equivalents.

What is claimed is:

1. An electronic apparatus comprising:
a main unit having a receptacle;
a disk drive including a housing, the housing removably stored in the receptacle;
a conduction member attached to the housing of the disk drive, the conduction member including a first conduction portion and connected to the disk drive; and
a second conduction portion in the receptacle, the second conduction portion coming into contact with the first conduction portion of the conduction member, thereby providing ground-connection between the main unit and the disk drive,
wherein the housing of the disk drive includes a storage section in which a medium is stored, and a driving section configured to drive the medium, the storage section and the driving section overlap each other, the storage section is larger than the driving section, and wherein the housing of the disk drive includes a depressed section that is defined by the storage section and the driving section, the depressed section is exposed to the receptacle when the disk drive is received in the receptacle, and the conduction member is located in the depressed section.

2. The electronic apparatus according to claim 1, wherein the storage section has a first surface exposed to the depressed section, the driving section has a second surface exposed to the depressed section and extending in a direction that intersects the first surface, and the conduction member is attached to the second surface.

3. The electronic apparatus according to claim 2, wherein the conduction member includes a first plate extending along the second surface, and a second plate extending along the first surface, the first conduction portion is formed by bending the second plate and comes into elastic contact with the second conduction portion, thereby providing ground-connection between the disk drive and the main unit.

4. The electronic apparatus according to claim 1, wherein the main unit includes an opening through which the disk drive is removably inserted, and a guide wall for guiding an insertion direction of the disk drive, and the guide wall moves into the depressed section and comes into contact with the conduction member when the disk drive is inserted through the opening into the receptacle.

5. The electronic apparatus according to claim 1, wherein the main unit includes a bottom exposed to the receptacle, and the conduction member and the second conduction portion are located in a region between the bottom of the main unit and the depressed section when the disk drive is inserted into the receptacle.

* * * * *